United States Patent
Kawakishi et al.

(10) Patent No.: US 8,346,306 B2
(45) Date of Patent: Jan. 1, 2013

(54) SIM-CARD SUSPEND CONTROL APPARATUS, SIM-CARD SUSPEND CONTROL METHOD, AND INFORMATION PROCESSING APPARATUS

(75) Inventors: Masanobu Kawakishi, Kawasaki (JP); Mikimasa Yamagishi, Kawasaki (JP); Takao Ohta, Kawasaki (JP); Shinichi Matsuya, Kawasaki (JP); Kiyotaka Sawae, Kawasaki (JP); Shinji Yamauchi, Kawasaki (JP); Masahiro Harima, Kawasaki (JP); Yoichi Kikuchi, Kawasaki (JP); Keigo Kuramoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 84 days.

(21) Appl. No.: 13/158,213

(22) Filed: Jun. 10, 2011

(65) Prior Publication Data
US 2012/0083315 A1 Apr. 5, 2012

(30) Foreign Application Priority Data
Oct. 1, 2010 (JP) ................................. 2010-224418

(51) Int. Cl.
*H04B 1/38* (2006.01)

(52) U.S. Cl. .................................. 455/558; 365/185.04
(58) Field of Classification Search .................. 370/311, 370/318; 455/13.8, 38.2, 69, 127.1, 343.1–343.6, 455/424, 522, 558, 571–574, 418, 419; 713/300, 713/320, 321, 323, 324, 330, 340
See application file for complete search history.

(56) References Cited

U.S. PATENT DOCUMENTS
7,558,110 B2 7/2009 Mizushima et al.
2009/0163245 A1* 6/2009 Oozeki .......................... 455/558

FOREIGN PATENT DOCUMENTS
JP 2007-317170 A 12/2007
JP 2008-084230 A 4/2008

* cited by examiner

*Primary Examiner* — Wesley Kim
*Assistant Examiner* — Dinh P Nguyen
(74) *Attorney, Agent, or Firm* — Fujitsu Patent Center

(57) ABSTRACT

A suspend control apparatus, disposed in an electronic device having a SIM card, includes a control unit that switches the state of the SIM card between a suspended state and a resumed state. The control unit determines, based on the state of SIM card access for data communication and the state of the SIM card when the data communication occurs, whether to give priority to SIM card access or switching to the suspended state, and sets the state of the SIM card accordingly.

8 Claims, 10 Drawing Sheets

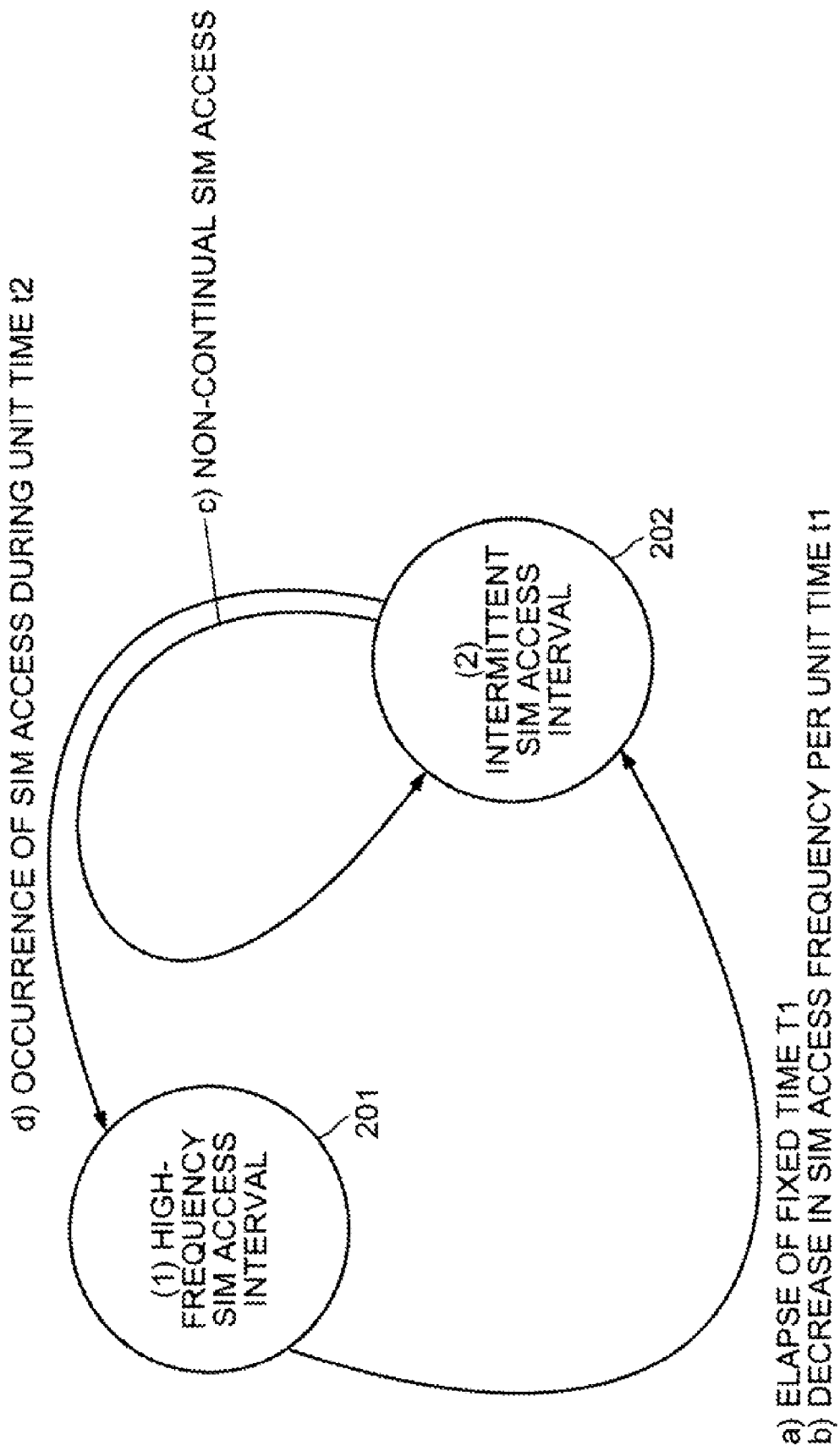

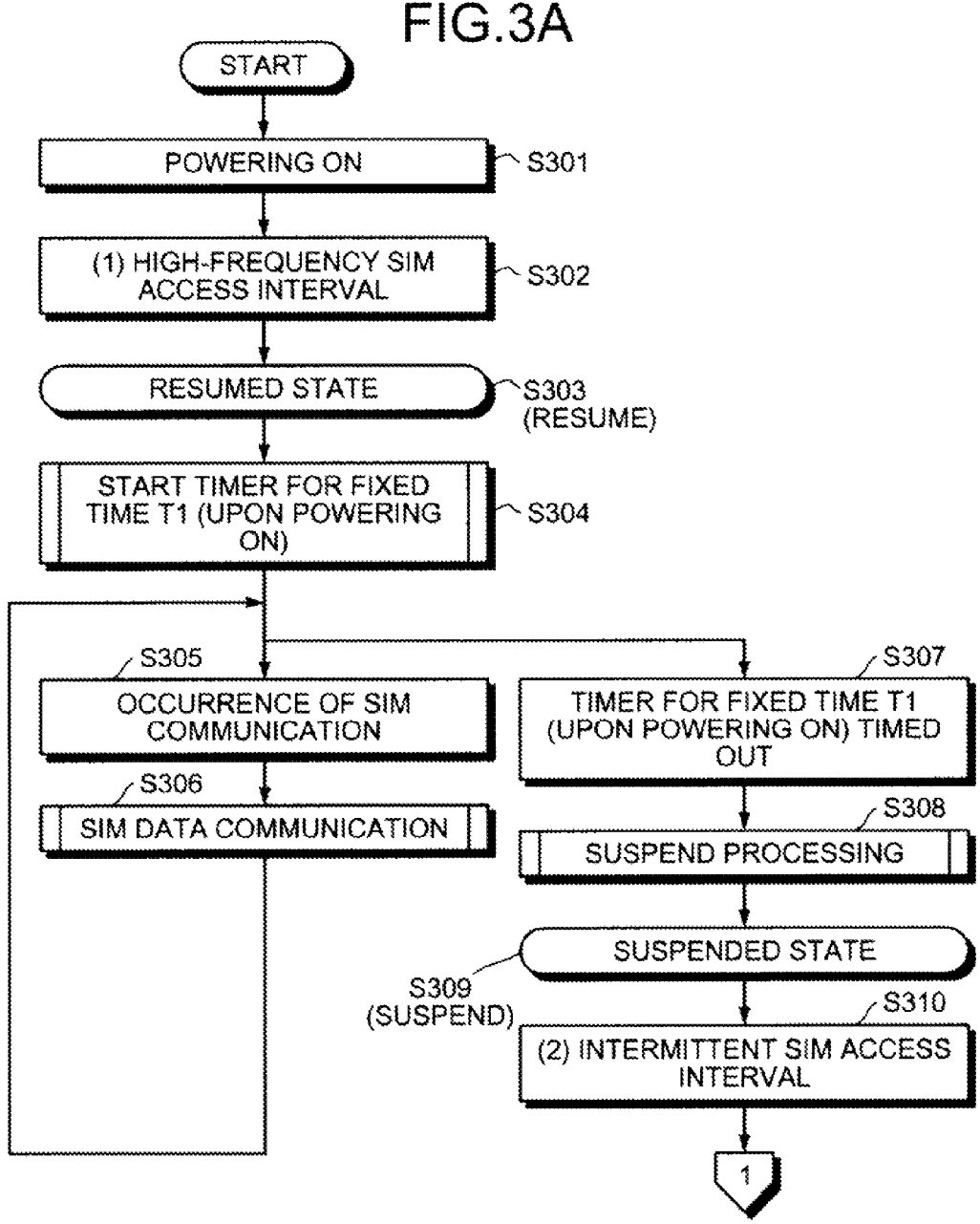

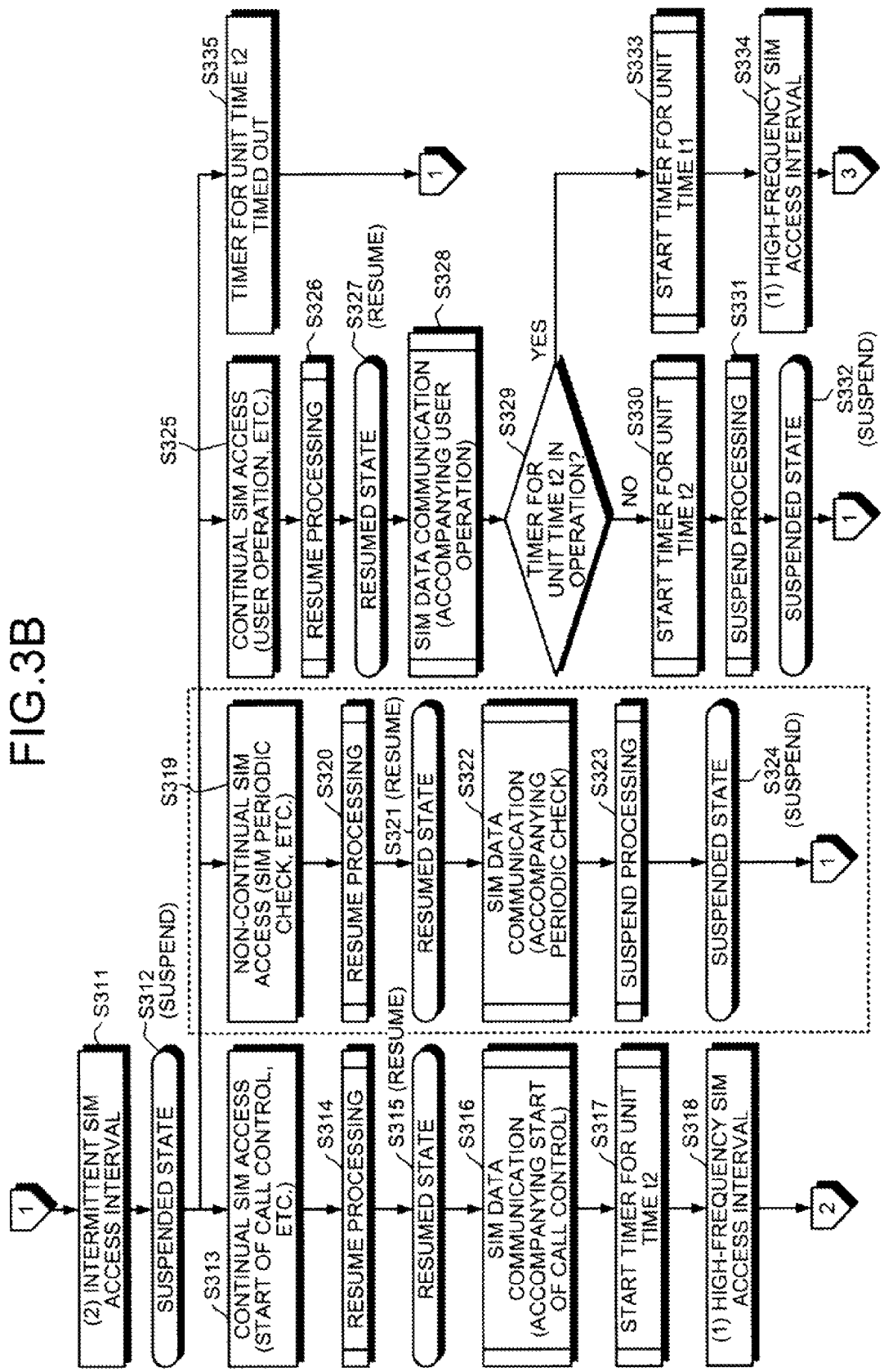

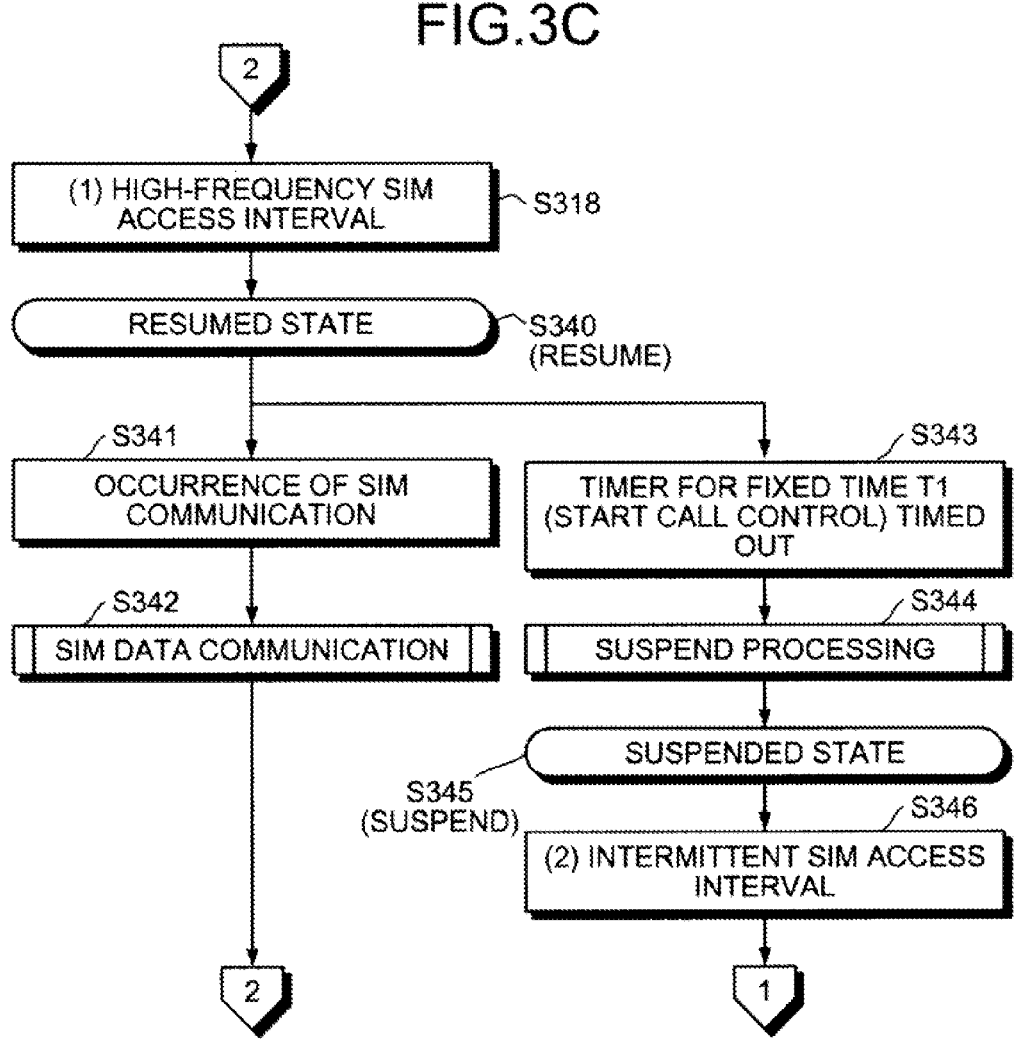

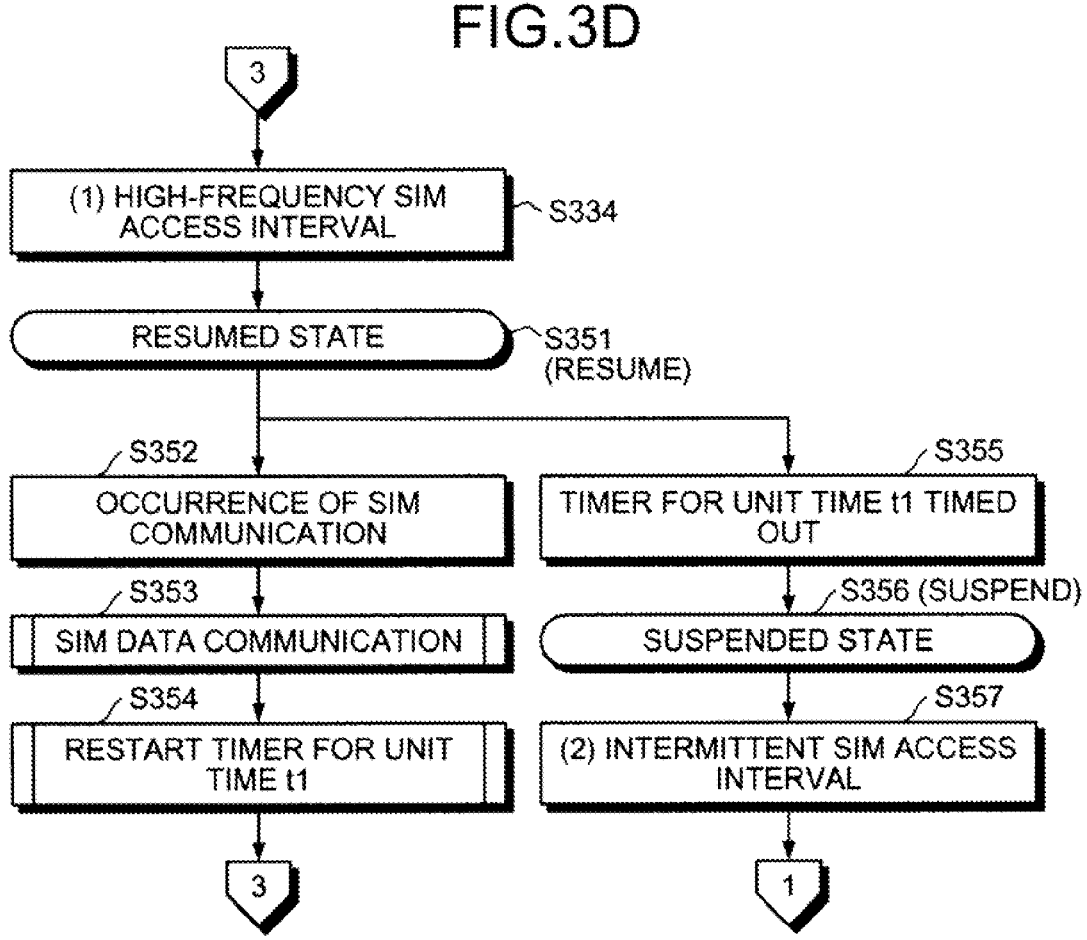

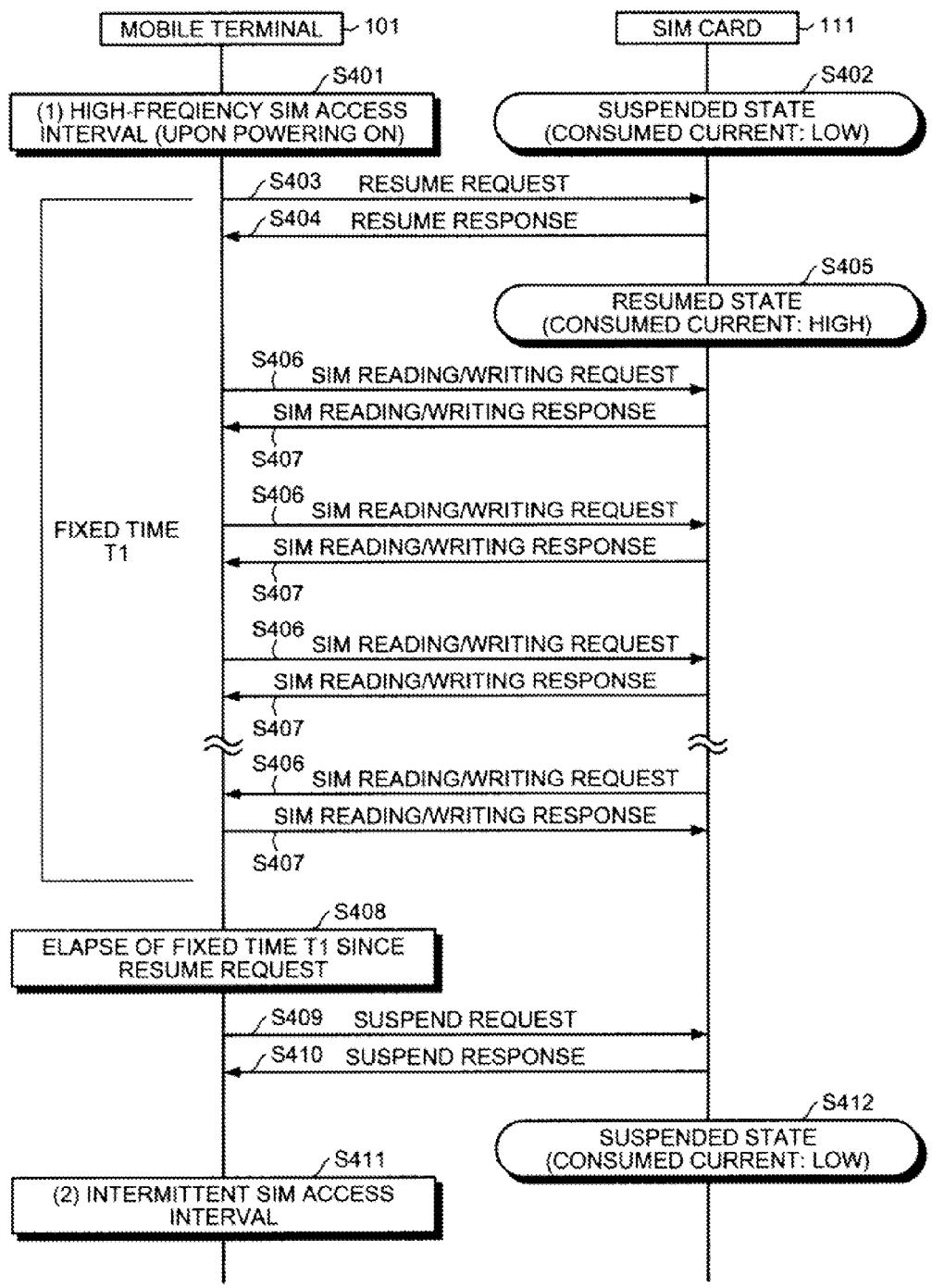

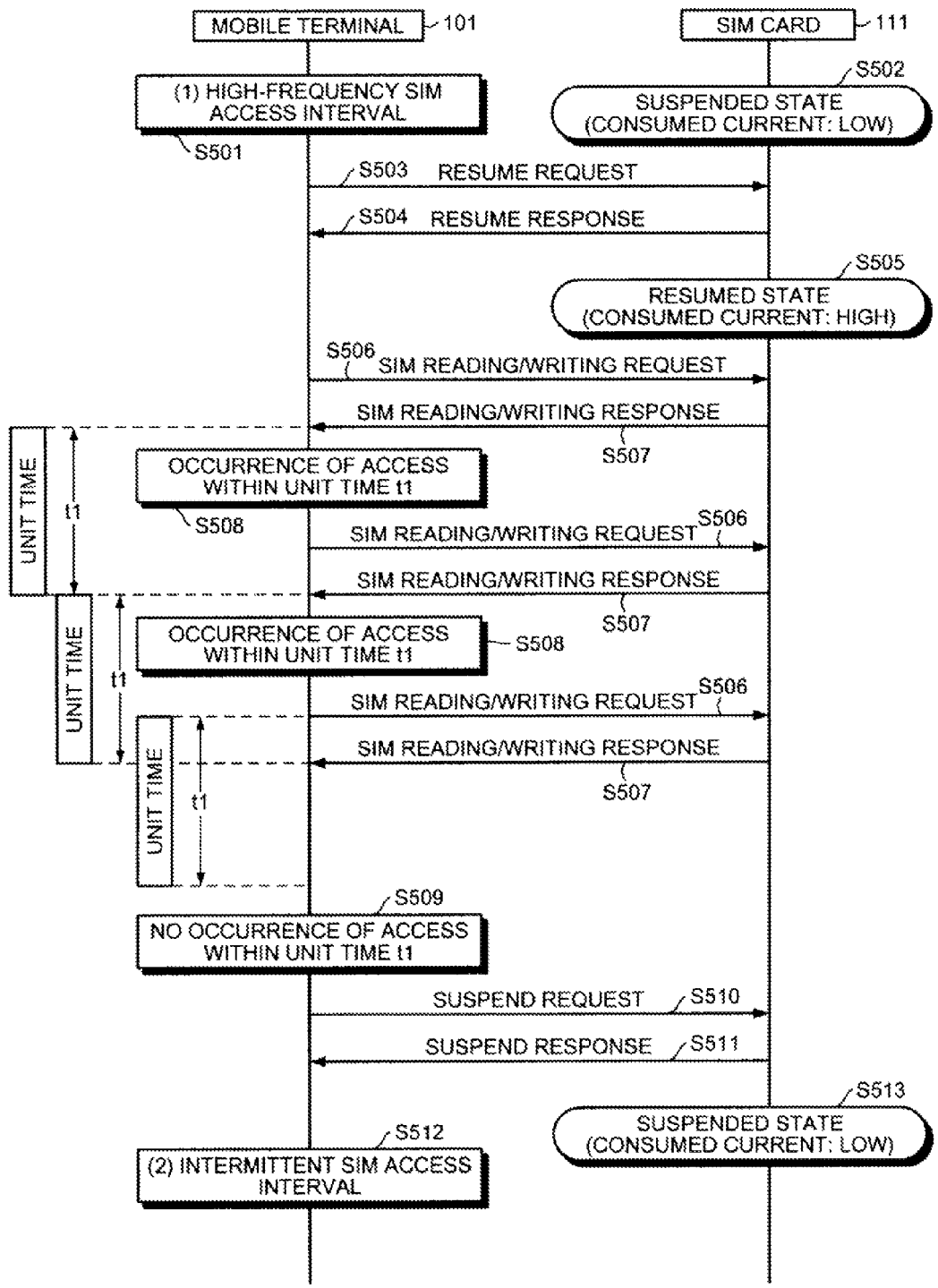

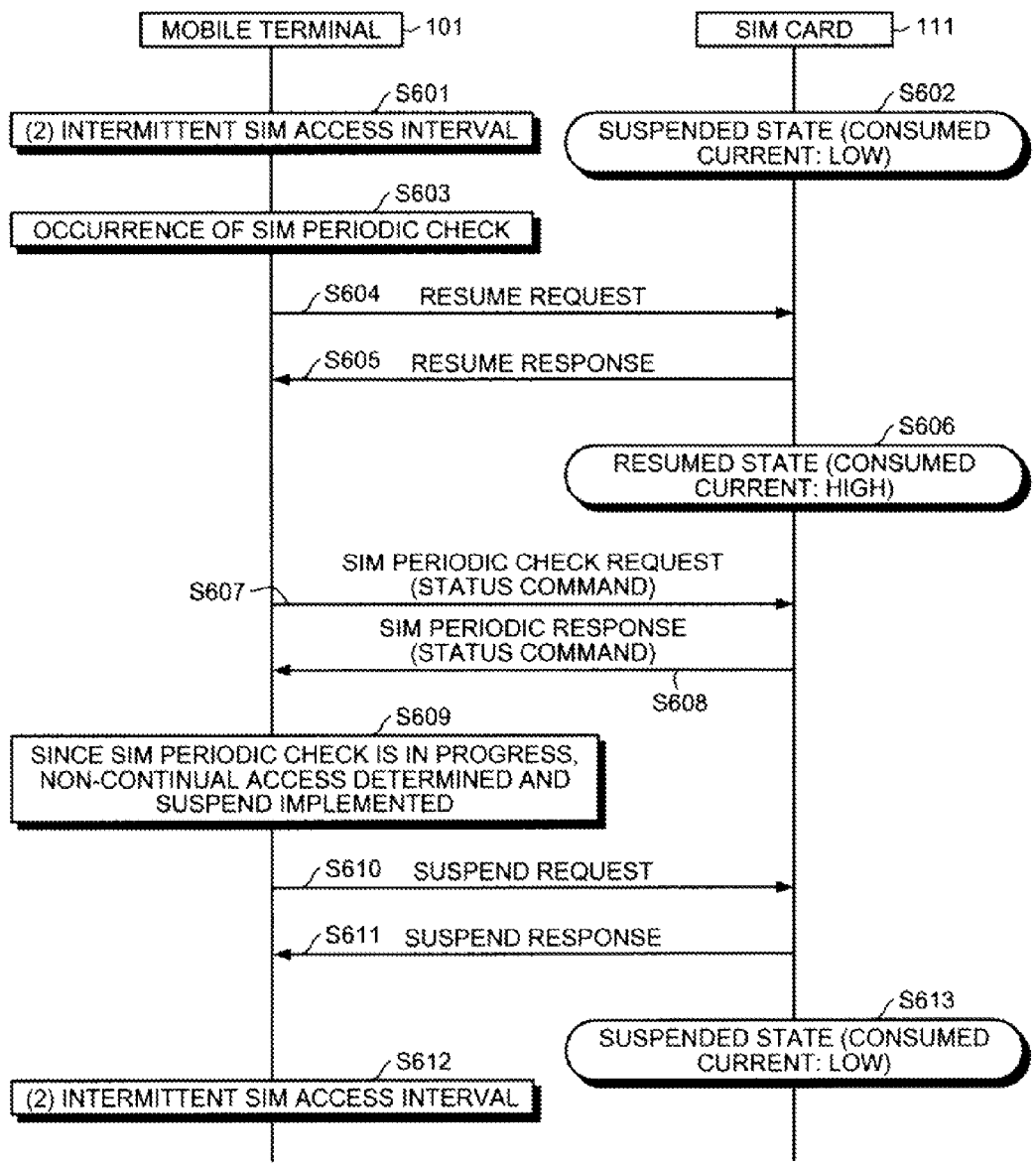

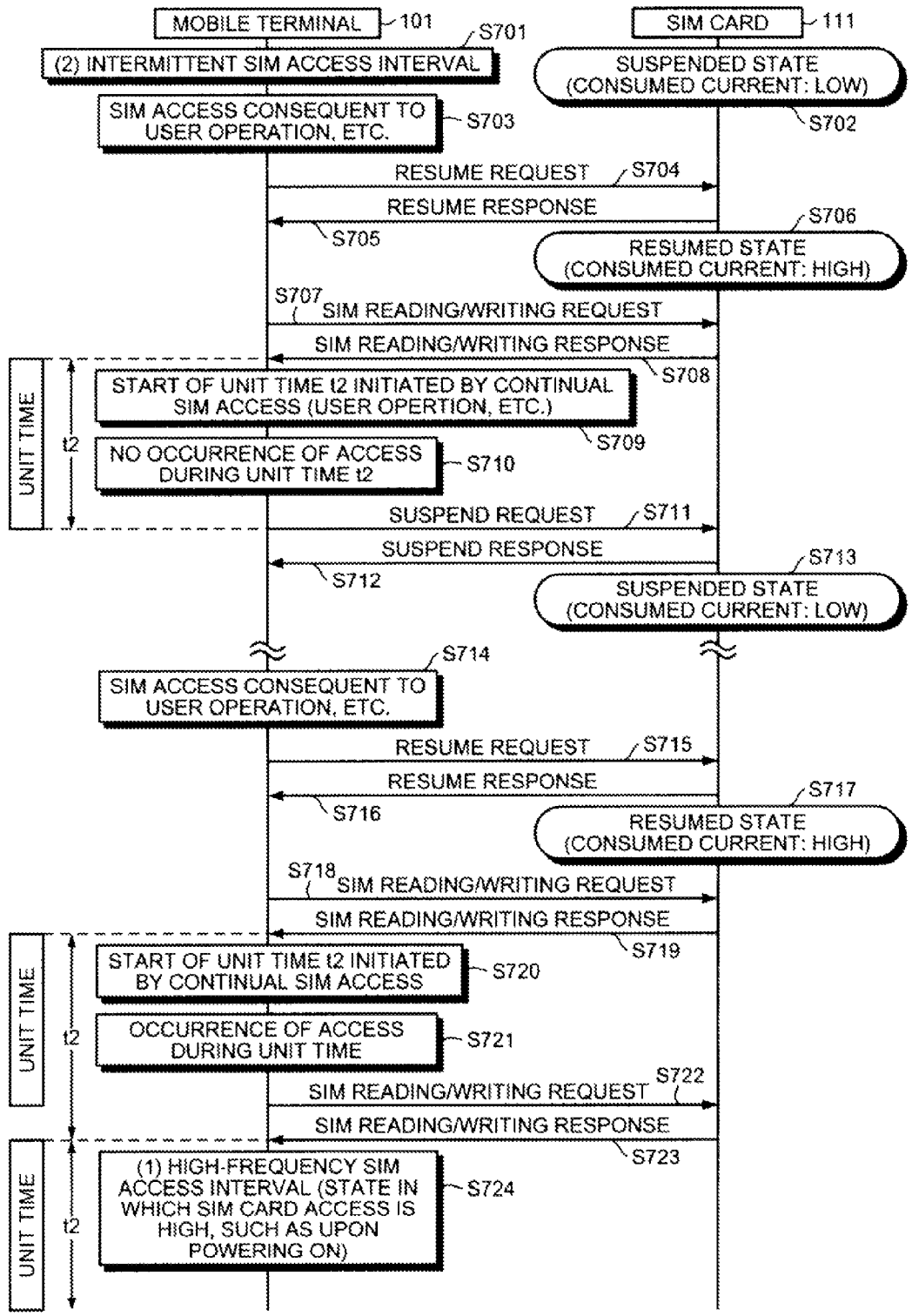

SIM-CARD SUSPEND CONTROL APPARATUS, SIM-CARD SUSPEND CONTROL METHOD, AND INFORMATION PROCESSING APPARATUS

CROSS REFERENCE TO RELATED APPLICATIONS

This application is based upon and claims the benefit of priority of the prior Japanese Patent Application No. 2010-224418, filed on Oct. 1, 2010, the entire contents of which are incorporated herein by reference.

FIELD

The embodiments discussed herein are related to a SIM-card suspend control apparatus, a SIM-card suspend control method, and information processing apparatus.

BACKGROUND

Subscriber Identity Module Cards (SIM cards) are equipped and used in mobile terminals such as mobile telephones. A SIM controller installed in a mobile terminal controls data communication with the SIM card (see, for example, Japanese Laid-Open Patent Publication No. 2007-317170). Further, to reduce power consumption by a USB device, a suspend function is provided to the USB device (see, for example, Japanese Laid-Open Patent Publication No. 2008-84230). Recently, in SIM cards, an Inter-Chip (IC)-USB interface (I/F) is used. In this IC-USB, an I/F similar to a typical USB scheme I/F is used as the physical I/F between the SIM controller and SIM card, facilitating increased speed.

In the conventional technology above, the SIM controller has to frequently and quickly access the SIM card to access files, check for SIM card insertion, etc., the control of which is performed in a normal (resumed) state.

Meanwhile, in mobile apparatuses, such as mobile telephones, to reduce power consumption, it is desirable to maintain a low power consuming (suspended) state as much as possible. In this regard, consideration must be given to the point that in order to switch between suspended and resumed states, a fixed period is necessary for processing. With consideration of this point, when suspend control is performed, efficient suspend control is required. For example, when unnecessary suspended states occur frequently without performing suspend/resume control according to the access state of the SIM card, at each suspended state, it takes time to change between the suspended state and the resumed state. Further, during the time it takes to change states, the SIM card cannot be accessed, arising in a problem of a decrease in the overall efficiency in accessing the SIM card.

The conventional technology above does not consider the efficiency of control for changing between the suspended and resumed states of the SIM card and accordingly, accessing of files in the SIM card could not be made more efficient. Furthermore, decreases in power consumption could not be achieved.

SUMMARY

According to an aspect of an embodiment, a suspend control apparatus, disposed in an electronic device having a SIM card, includes a control unit that switches the state of the SIM card between a suspended state and a resumed state. The control unit determines, based on the state of SIM card access for data communication and the state of the SIM card when the data communication occurs, whether to give priority to SIM card access or switching to the suspended state, and sets the state of the SIM card accordingly.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram of state transition for a SIM card.

FIGS. 3A, 3B, 3C, and 3D are flowcharts of state transition processing.

FIG. 4 is a sequence diagram detailing fixed-period-T1-monitoring processing at powering ON.

FIG. 5 is a sequence diagram detailing processing for monitoring SIM access per unit time t1.

FIG. 6 is a sequence diagram detailing processing for monitoring non-continual SIM access.

FIG. 7 is a sequence diagram detailing processing for monitoring SIM access per unit time t2.

DESCRIPTION OF EMBODIMENTS

Figure 1:
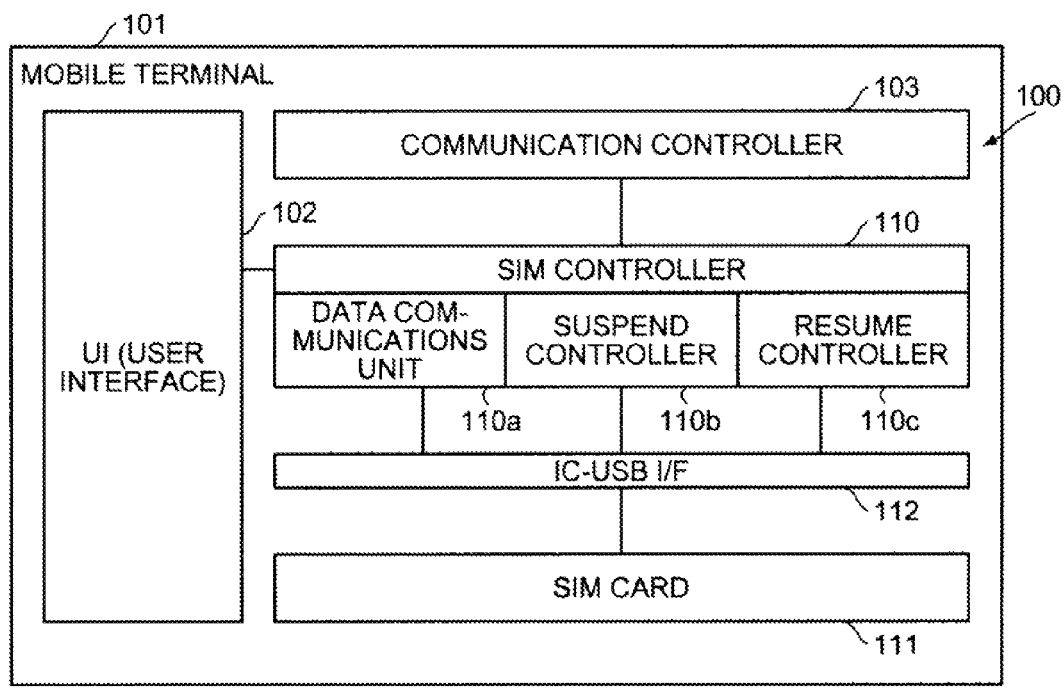
FIG. 1 is a block diagram of a SIM-card suspend control apparatus according to an embodiment.

Preferred embodiments of the present invention will be explained with reference to the accompanying drawings.

FIG. 1 is a block diagram of a SIM-card suspend control apparatus 100 according to an embodiment. The SIM-card suspend control apparatus 100 is disposed in a mobile terminal 101 such as a mobile telephone that uses a SIM card 111, which is an IC card. The SIM card 111 has non-volatile memory, a controller, and an interface (I/F) for data input and output.

The mobile terminal 101 is equipped with a communication controller 103 that transmits and receives data through a user interface 102 (such as an operation button and display) and an external communications network. The SIM controller 110 has a data communications unit 110a, a suspend controller 110b, and a resume controller 110c. The SIM controller 110 is connected to the SIM card 111 through an IC-USB I/F 112.

The data communications unit 110a transmits data to and receives data from the SIM card 111. Further, the data communications unit 110a transmits data to and receives data from an external apparatus, through the communication controller 103.

The suspend controller 110b executes control to change the SIM card 111 state to a low power consumption state (suspended state) that decreases power consumption. The suspend controller 110b further executes control to functionally limit SIM card 111 access. For example, by the suspension of a clock supplied to the SIM card 111, the suspend controller 110b reduces the power consumption of the SIM card 111. On the other hand, the resume controller 110c regards the power consumption of the SIM card 111 as a normal state (resumed state) and executes control for a normal state in which there is no functional limit on SIM card 111 access. The suspend controller 110b is disposed to suppress the power consumption of the power source of the mobile terminal 101, in particular, battery consumption.

The suspend controller 110b and the resume controller 110c, according to the operation state of the user interface 102, the data communication state of the communication controller 103, etc., cause the SIM card 111 state to change to the suspended state or the resumed state.

For example, according to the amount (or frequency) of SIM card 111 access in the mobile terminal 101, any one among (1) high-frequency SIM access interval and (2) intermittent SIM access interval is set. During the (1) high-frequency SIM access interval, reductions in time for accessing files in the SIM card 111 is given priority. During the (2) intermittent SIM access interval, an IC-USB suspended state is given priority. In this manner, control is performed to suitably change the SIM card 111 state to a suspended state or a resumed state, according to the frequency that the SIM card 111 is accessed. Consequently, reductions in the access time to the SIM card 111 and in power consumption (improved efficiency of power consumption) are achieved.

FIG. 2 is a diagram of state transition for the SIM card, depicted according to access state. State transition by the SIM controller 110 is depicted. Here, state transition between a (1) high-frequency SIM access interval 201 state and a (2) intermittent SIM access interval 202 state will be described.

Concerning the (1) high-frequency SIM access interval 201 (reductions in time for accessing files in the SIM card 111 is given priority), when the mobile terminal 101 is powered on and when an incoming/outgoing call is controlled by the communication controller 103, etc., the frequency that the SIM card 111 is accessed is extremely high (the SIM card 111 storing user operations and information necessary for these processes, such as telephone number, language information, ID, security processing information, etc. of mobile terminal 101). As a result, when the access frequency of the SIM card 11 is high, access is performed under the resumed state. Consequently, without meaningless processing for suspend/resume switching, the time consumed for suspend/resume switching is reduced, whereby reductions in time for accessing the SIM card 111 is given priority, facilitating access efficiency and increased speed.

When the transition state is the (1) high-frequency SIM access interval 201 and thereafter, *a*) an elapse of a fixed period T1 (e.g., 2 minutes) from the start of the resumed state or *b*) a decrease in SIM access frequency per unit time t1 (e.g., 2 to 5 seconds) is detected, transition to the (2) intermittent SIM access interval 202 occurs.

Concerning the (2) intermittent SIM access interval 202 (IC-USB suspended state given priority), *c*) access of the SIM card 111 during non-use, such as during standby, is access processing (periodic check of the SIM card 111) automatically performed periodically by the mobile terminal 101. A periodic check is an insertion/removal check confirming that the SIM card 111 has not been removed from the mobile terminal 101. The periodic check, unlike the reading of/writing to the SIM card 111, is SIM access that ends in a short amount of time (e.g., approximately 50 msec.), without continual access occurring. Consequently, the state is changed temporarily to the resumed state only for the time needed for the periodic check of the SIM card 111, and after the periodic check processing is completed, the state is immediately returned to the suspended state, and the (2) intermittent SIM access interval 202 state is maintained. As a result, the suspended state is given priority and processing for the periodic check of the SIM card 111 can be implemented with minimal power consumption. For example, transition from the resumed state to the suspended state (visa versa) can be performed in approximately 50 msec.

*d*) If SIM card 111 access occurs during user operation in a standby state (e.g., address book reading, etc.) or when an incoming/outgoing call is controlled by the communication controller 103, the SIM card 111 may continue to be accessed over a given period of time. In this case, access of the SIM card 111 is monitored by a unit time t2 (e.g. 2 to 5 seconds). If repeated access occurs within the unit time t2, transition to the (1) high-frequency SIM access interval 201 occurs. If no access occurs within the unit time t2, the suspended state continues to be given priority. Unit time t1 is a first unit time and unit time t2 is a second time unit, these unit times may be mutually different.

FIGS. 3A, 3B, 3C, and 3D are flowcharts of state transition processing. This transition processing is executed by a CPU (not depicted) of the SIM controller 110. Using FIG. 3A, processing at the time of powering on of the mobile terminal 101 will be described. Upon powering on of the mobile terminal 101 (power source ON) (step S301), the (1) high-frequency SIM access interval 201 depicted in FIG. 2 is entered (step S302), and the mobile terminal 101 is in the normal (resumed) state (step S303: resume).

Consequent to the power source being turned ON, the SIM controller 110 of the mobile terminal 101 starts a timer for the fixed period T1 (step S304). The SIM controller 110 has a timer for timekeeping. During the fixed period T1, the SIM card 111 remains in the resumed state maintained by the resume controller 110*c*. When the power source is turned ON, data communication with the SIM card 111 occurs continually (frequently) during the fixed period T1, to startup the mobile terminal 101 (step S305), the SIM controller 110 performs data communication with the SIM card 111 (step S306). After execution of step S306, during the fixed period T1, step S305 is returned to and data communication is performed multiple times.

When the timekeeping by the timer ends (timed out) for the fixed period T1 starting at powering ON (step S307), the SIM controller 110 performs suspend processing to change the SIM card 111 state from the resumed state to the suspended state (step S308), and sets the SIM card 111 to be in the suspended state (step S309: suspend). Consequently, the mobile terminal 101 is in the (2) intermittent SIM access interval 202 state depicted in FIG. 2 (step S310). Subsequently, the processing depicted in FIG. 3B is transitioned to. This state transition corresponds to (1)*a*) depicted in FIG. 2.

Next, using FIG. 3B, processing primarily occurring during the intermittent SIM access interval 202 will be described. When the mobile terminal 101 is in the (2) intermittent SIM access interval 202 state (step S311), the mobile terminal 101 is in the suspended stated (step S312: suspend). This suspended state will under go multiple state transitions consequent to changes in the access state of the SIM card 111.

Depicted first is continual SIM access occurring during a suspended state; and when call control is started through the communication controller 103 (step S313), the SIM controller 110 performs resume processing to change the SIM card 111 state from the suspended state to the resumed state (step S314), and sets the SIM card 111 to be in the resumed state (step S315: resume). The state transition here corresponds to (2)*d*) depicted in FIG. 2. Further, with the start of call control, the SIM controller 110 performs data communication with the SIM card 111 (step S316), and starts a timer for the unit time t2 (step S317). By the processing above, the mobile terminal 101 enters the (1) high-frequency SIM access interval 201 depicted in FIG. 2 (step S318). Subsequently, the processing depicted in FIG. 3C is transitioned to.

If non-continual SIM access (periodic check of SIM card, etc,) occurs during the suspended state after step S312 (step S319), the SIM controller 110 performs the resume processing to temporarily change the SIM card 111 state from the suspended state to the resumed state (step S320) and temporarily sets the SIM card 111 in the resumed state (step S321: resume).

The SIM controller 110 performs the data communication (with the SIM card 111) accompanying periodic check (step S322), immediately performs the suspend processing to change the state to the suspended state (step S323), and sets the SIM card 111 in the suspended state (step S324: suspend). As a result, without transitioning until the high-frequency SIM access interval 201 state depicted in FIG. 2, the mobile terminal 101 returns to the (2) intermittent SIM access interval 202. The state transition here corresponds to (2)c) depicted in FIG. 2. Subsequently, step S311 is returned to and the processing therefrom is performed.

If, during the suspended state after step S312, continual SIM access occurs, for example, user operation at the user interface 102 has occurred (step S325), the SIM controller 110 performs the resume processing on the SIM card 111 (step S326) and sets the SIM card 111 to be in the resumed state (step S327: resume). The SIM controller 110 performs data communication with the SIM card 111, according to the user operation (step S328), and starts a timer for the unit time t2 (step S329).

Subsequently, the SIM controller 110 determines if the timer for the unit time t2 is still in operation (is not timed out) (step S329). If the timer for unit time t2 has stopped (step S329: NO), the SIM controller 110 again starts the timer for unit time t2 (step S330), performs the suspend processing to change the state to the suspended state (step S331), and sets the SIM card 111 to be in the suspended state (step S332: suspend). Subsequently, step S311 is returned to and the processing after the suspended state is performed.

On the other hand, at step S329, if the timer for unit time t2 is still in operation (step S329: YES), the SIM controller 110 starts a timer for the unit time t1 (step S333), sets the (1) high-frequency SIM access interval 201 (step S334), and transitions to the processing depicted in FIG. 3D. In this case, the SIM card 111 remains in the resumed state.

Finally, if the unit time t2 elapses (timer is timed out) during the suspended state after step S3121 (step S335), step S311 is returned to and the processing after the suspended state is performed.

Next, using FIG. 3C, fixed-period-T1-monitoring processing by the mobile terminal 101 during (1) high-frequency SIM access interval will be described. This processing is the processing subsequent to step S318 in FIG. 3B. Here, the SIM card 111 is in the resumed state (step S340: resume). During this resumed state, if SIM communication occurs (step S341), the SIM controller 110 communicates SIM data with the SIM card 111 (step S342), returns to step S318, and continues the processing thereafter.

Further, if the fixed period T1 elapses (timer is timed out) during the resumed state at step S340 (step S343), the SIM controller 110 performs the suspend processing to change the SIM card 111 state from the resumed state to the suspended state (step S344), and sets the SIM card 111 to be in the suspended state (step S345: suspend). Consequently, the mobile terminal 101 enters the (2) intermittent SIM access interval 202 depicted in FIG. 2 (step S346). Subsequently, the processing depicted at step S311 in FIG. 3B is returned to and executed. The state transition here corresponds to (1)a) in FIG. 2.

Next, using FIG. 3D, unit time t1 monitoring processing by the mobile terminal 101 during the (1) high-frequency SIM access interval will be described. This processing is the processing subsequent to step S334 in FIG. 3B. Here, the SIM card 111 is in the resumed state (step S351: resume). If SIM communication occurs during this resumed state (step S352), the SIM controller 110 transmits SIM data to and receives SIM data from the SIM card 111 (step S353), restarts the timer for the unit time t1 (step S354), returns to step S334 and continues processing therefrom.

If the unit time t1 elapses (timer is timed out) during the resumed state at step S351 (step S355), the SIM controller 110 changes the SIM card 111 state from the resumed state to the suspended state and sets the SIM card 111 to be in the suspended state (step S356: suspend). Consequently, the mobile terminal 101 enters the (2) intermittent SIM access interval 202 depicted in FIG. 2 (step S357). Subsequently, the processing depicted at step S311 in FIG. 3B is returned to executed. The transition state here corresponds to (1)b) in FIG. 2. In other words, the suspended state is switched to as a result of a decrease in the SIM access frequency per unit time t1.

Next, processing between the mobile terminal 101 and the SIM card 111 will be described. FIG. 4 is a sequence diagram detailing the fixed-period-T1-monitoring processing at powering ON. This processing corresponds to the transition depicted by (1)a) in FIG. 2 and the flowcharts in FIG. 3A and FIG. 3C.

When the mobile terminal 101 is powered ON, the (1) high-frequency SIM access interval 201 state is entered (step S401) and at this time, the SIM card 111 is in the low power consuming suspended state (step S402). The mobile terminal 101 (specifically, the SIM controller 110) makes a resume request to the SIM card 111 (step S403). The SIM card 111 sends a resume response to the mobile terminal 101 (step S404). Consequently, the SIM card 111 enters the high power consuming resumed state (step S405).

The mobile terminal 101 starts the timer for the fixed period T1 upon the resume request at step S403 and monitors the fixed period T1. During this fixed period T1, requests (from the mobile terminal 101 to the SIM card) for SIM reading or writing after powering ON (step S406) and responses (from the SIM card 111 to the mobile terminal 101) for SIM reading or writing (step S407) are transmitted.

After the resumed state, when the fixed period T1 elapses (step S408), the mobile terminal 101 determines that the processing for powering ON has ended and sends a suspend request to the SIM card 111 (step S409). The SIM card 111 sends a suspend response to the mobile terminal 101 (step S410). Consequently, the mobile terminal 101 state transitions to the (2) intermittent SIM access interval 202 (step S411). The SIM card 111 enters the low power consuming suspended state (step S412).

FIG. 5 is a sequence diagram detailing processing for monitoring SIM access per unit time t1. This processing corresponds to the transition depicted by (1)b) in FIG. 2 and the flowchart in FIG. 3D. After at least the fixed period T1 has elapsed since the powering ON of the mobile terminal 101, transition to the (1) high-frequency SIM access interval 201 state (step S501) is assumed. At this time, the SIM card 111 is in the low power consuming suspended state (step S502). The mobile terminal 101 (specifically, the SIM controller 110) sends a resume request to the SIM card 111 (step S503). The SIM card 111 sends a resume response to the mobile terminal 101 (step S504). Consequently, the SIM card 111 enters the high power consuming resumed state (step S505).

The mobile terminal 101 sends a read/write request(s) to the SIM card 111 (step S506) and the SIM controller 110 determines each read/write response from the SIM card 111 (step S507) as one access during the unit time t1 (step S508), starts the timer for the unit time t1, and monitors the unit time t1. During this unit time t1, each time there is a SIM read/ write request from the mobile terminal 101 to the SIM card 111 (step S506) and a SIM read/write response from the SIM card 111 to the mobile terminal 101 (step S507), a timer for the unit time t1 is started.

If the SIM card 111 is not accessed within this unit time t1 (step S509), the mobile terminal 101 determines that SIM access frequency per unit time t1 has decreased, and sends a suspend request to the SIM card 111 (step S510). The SIM card 111 sends a suspend response to the mobile terminal 101 (step S511). Consequently, the mobile terminal 101 state transitions to the (2) intermittent SIM access interval 202 (step S512). Further, the SIM card 111 enters the low power consuming suspended state (step S513).

FIG. 6 is a sequence diagram detailing processing for monitoring non-continual SIM access. This processing corresponds to the transition depicted by (2)c) in FIG. 2 and the processing at steps S319 to S324 (encompassed by dotted line) in the flowchart depicted in FIG. 3B. When the mobile terminal 101 is in the (2) intermittent SIM access interval 202 state (step S601), the SIM card 111 is in the low power consuming suspended state (step S602).

If a periodic check of the SIM card 111 occurs (step S603), the mobile terminal 101 (specifically, the SIM controller 110) sends a resume request to the SIM card 111 (step S604). The SIM card 111 sends a resume response to the mobile terminal 101 (step S605). Consequently, the SIM card 111 enters the high power consuming resume state (step S606). The mobile terminal 101 sends to the SIM card 111, a request for a SIM periodic check by a STATUS command, etc. (step S607). The SIM card 111 sends to the mobile terminal 101, a response for a SIM periodic check by a STATUS command, etc. (step S608).

The mobile terminal 101 performs the SIM periodic check with the SIM card 111 temporarily in the resumed state. However, the mobile terminal 101 determines that non-continual SIM access has occurred and not access of the SIM card 111 continually occurring over a long period. Consequently, immediately after the execution of the SIM periodic check at steps S607 and S608, the mobile terminal 101 decides to implement the suspend processing on the SIM card 111 (step S609).

The mobile terminal 101 sends to the SIM card 111, a suspend request (step S610), and the SIM card 111 sends to the mobile terminal 101, a suspend response (step S611). Consequently, the mobile terminal 101 state transitions to the (2) intermittent SIM access interval 202 (step S612). Further, the SIM card 111 enters the low power consuming suspended state (step S613).

In the processing examples above, although the SIM controller 110 of the mobile terminal 101 is configured to implement the suspend processing immediately after periodic check of the SIM card 111, configuration is not limited hereto and configuration may be such that an implementation period for the suspended state is determined based on the types of files accessed in the SIM card 111 (presence of related file, continual data volume analysis), or by using a given command, etc.

FIG. 7 is a sequence diagram detailing processing for monitoring SIM access per unit time t2. This processing corresponds to the processing (excluding the processing at steps S319 to S324 encompassed by a dotted line) depicted in the flowchart in FIG. 3B. When the mobile terminal 101 is in the (2) intermittent SIM access interval 202 (step S701), the SIM card 111 is in the low power consuming suspend state (step S702)

Here, a case where no SIM access occurs during the unit time t2 will be described as a first example. When the SIM card 111 is accessed consequent to the user manipulating the user interface 102, etc. (step S703), the mobile terminal 101 (specifically, the SIM controller 110) sends a resume request to the SIM card 111 (step S704). The SIM card 111 sends a resume response to the mobile terminal 101 (step S705). Consequently, the SIM card 111 enters the high power consuming resumed state (step S706).

The mobile terminal 101 sends a read/write request to the SIM card 111 (step S707). Upon receiving a read/write response from the SIM card 111 (step S708), the mobile terminal 101 starts a timer for the unit time t2 and monitors the unit time t2 (step S709). This unit time t2 is set by user operation, etc. according to continual SIM file processing (frequency of SIM reading/writing).

As depicted, if the SIM card 111 is not accessed during the unit time t2 (step S710), the mobile terminal 101 sends a suspend request to the SIM card 111 (step S711). The SIM card 111 sends a suspend response to the mobile terminal 101 (step S712) and enters the low power consuming suspended state (step S713). The processing up to step S713 corresponds to the transition depicted by (2)c) in FIG. 2.

A case where SIM access occurs during the unit time t2 will be described as a second example. When the SIM card 111 is accessed consequent to the user manipulating the user interface 102 (step S714), the mobile terminal 101 sends a resume request to the SIM card 111 (step S715), and the SIM card 111 sends a resume response to the mobile terminal 101 (step S716). Consequently, the SIM card 111 enters the high power consuming resumed state (step S717).

The mobile terminal 101 sends a read/write request to the SIM card 111 (step S718). Each time the mobile terminal 101 receives a read/write response from the SIM card 111 (step S719), the mobile terminal 101 starts a timer for the unit time t2 and monitors the unit time t2 (step S720). As depicted, the SIM card 111 is assumed to be accessed again during the unit time t2 (step S721). As a result, the mobile terminal 101 sends a read/write request to the SIM card 111 (step S722), and the SIM card 111 sends a read/write response (step S723).

Each time the mobile terminal 101 receives a read/write response from the SIM card 111 (step S723), the mobile terminal 101 starts a timer for the unit time t2. The mobile terminal 101 transitions to the (1) high-frequency SIM access interval 201 state (step S724). The processing at steps S715 to S724 correspond to the transition depicted by (2)d) in FIG. 2.

As described, according to the embodiments above, control for switching between a suspended state and a resumed state is performed automatically according to the access volume of the SIM card in a mobile terminal. Consequently, improved efficiency in terms of the overall time consumed for data communication with the SIM card and in terms of power consumption can both be achieved.

Further, according to the embodiments above, for a periodic check of the SIM card, etc. initiated and performed by the mobile terminal, the state is temporarily changed from the suspended state to the resumed state only for the duration of the periodic check of the SIM card and after the periodic check has ended, is immediately returned to the suspended state. Consequently, over the entire operation period of the mobile terminal, the efficiency of SIM card access can be improved (access for processing initiated by the mobile terminal, consuming little time, and occurring frequently) and without meaningless power consumption, power consumption can be suppressed. Therefore, battery consumption by the mobile terminal can be suppressed, enabling longer hours of operation.

Moreover, in the embodiments, although an example has been described where the suspend control apparatus is equipped in a mobile terminal and a SIM card is inserted in the mobile terminal, the suspend control apparatus is not limited to a mobile terminal and may be equipped in a common electronic device, an information processing apparatus, etc. Further, a configuration may be adopted in which the SIM card is an IC card inserted in the electronic device, the information processing apparatus, etc.; and the electronic device, information processing apparatus, etc. frequently checks for the insertion/removal of the IC card, frequently performs data communication with the IC card, and performs suspend control.

According to the embodiments, suspend and resume control can be efficiently performed according to SIM card access, and improved efficiency of overall SIM card access and reduced power consumption can be achieved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A SIM-card suspend control apparatus disposed in an electronic device having a SIM card, the SIM-card suspend control apparatus comprising:
    a control unit that switches the state of the SIM card between a suspended state and a resumed state, wherein
    the control unit determines, based on the state of SIM card access for data communication and the state of the SIM card when the data communication occurs, whether to give priority to SIM card access or switching to the suspended state, and sets the state of the SIM card accordingly, and
    if an insertion/removal check of the SIM card occurs while the SIM card is in the suspended state, the control unit temporarily sets the SIM card to be in the resumed state for a period equivalent to the time consumed for access to perform the insertion/removal check once and upon each completion of the insertion/removal check, returns the state of the SIM card to the suspended state.

2. The SIM-card suspend control apparatus according to claim 1, wherein control unit gives priority to SIM card access according to the amount of SIM card access.

3. The SIM-card suspend control apparatus according to claim 1, wherein
    the control unit gives priority to switching to the suspended state according to the amount of SIM card access.

4. The SIM-card suspend control apparatus according to claim 1, wherein
    the control unit, upon powering on of the electronic device, sets the SIM card to be in the resumed state and starts a timer for a given period during which the SIM card is continually accessed accompanying startup of the electronic device; during operation of the timer, gives priority to SIM card access; and consequent to the operation of the timer ending, gives priority to switching to the suspended state.

5. The SIM-card suspend control apparatus according to claim 1, wherein
    the control unit judges the frequency of SIM card access when the SIM card is in the resumed state, and if the frequency decreases, switches the state of the SIM card to the suspended state.

6. The SIM-card suspend control apparatus according to claim 1, wherein
    the control unit judges the frequency of SIM card access when the SIM card is in the suspended state, and switches the state of the SIM card to the resumed state according to the frequency that the SIM card is accessed.

7. A SIM-card suspend control method of an electronic device having a SIM card, the SIM-card suspend control method comprising:
    switching the state of the SIM card between a suspended state and a resumed state, wherein
    the switching includes determining, based on the state of SIM card access for data communication and the state of the SIM card when the data communication occurs, whether to give priority to SIM card access or switching to the suspended state;
    and setting the state of the SIM card accordingly, and
    if an insertion/removal check of the SIM card occurs while the SIM card is in the suspended state, the control unit temporarily sets the SIM card to be in the resumed state for a period equivalent to the time consumed for access to perform the insertion/removal check once and upon each completion of the insertion/removal check, returns the state of the SIM card to the suspended state.

8. An information processing apparatus that includes a SIM card and performs suspend control of the SIM card, the information processing apparatus comprising:
    a control unit that switches the state of the SIM card between a suspended state and a resumed state, wherein
    the control unit determines, based on the state of SIM card access for data communication and the state of the SIM card when the data communication occurs, whether to give priority to SIM card access or switching to the suspended state, and sets the state of the SIM card accordingly, and
    if an insertion/removal check of the SIM card occurs while the SIM card is in the suspended state, the control unit temporarily sets the SIM card to be in the resumed state for a period equivalent to the time consumed for access to perform the insertion/removal check once and upon each completion of the insertion/removal check, returns the state of the SIM card to the suspended state.

* * * * *